(12) United States Patent
Hung et al.

(10) Patent No.: US 9,128,729 B1
(45) Date of Patent: Sep. 8, 2015

(54) SYSTEM AND METHOD FOR AUTOMATICALLY CONFIGURING BIOS PERFORMANCE PROFILES

(71) Applicant: Quanta Computer Inc., Tao Yuan Shien (TW)

(72) Inventors: Ming-Hung Hung, Taoyuan County (TW); Yu-Han Lin, Taoyuan County (TW); Wei-Yu Chien, Taoyuan County (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 14/528,578

(22) Filed: Oct. 30, 2014

Related U.S. Application Data

(60) Provisional application No. 62/047,528, filed on Sep. 8, 2014.

(51) Int. Cl.
*G06F 9/44* (2006.01)
*G06F 9/445* (2006.01)

(52) U.S. Cl.
CPC ............ *G06F 9/4403* (2013.01); *G06F 9/4451* (2013.01)

(58) Field of Classification Search
CPC .................................................... G06F 9/4401
USPC ............................................................ 713/2
See application file for complete search history.

(56) References Cited

U.S. PATENT DOCUMENTS

| | | | |
|---|---|---|---|
| 6,658,562 B1 * | 12/2003 | Bonomo et al. | 713/1 |
| 6,671,802 B1 * | 12/2003 | Ott | 713/100 |
| 6,694,196 B2 | 2/2004 | Tuttle et al. | |
| 6,718,464 B2 * | 4/2004 | Cromer et al. | 713/2 |
| 7,107,191 B2 | 9/2006 | Stewart et al. | |
| 7,120,065 B2 | 10/2006 | Janzen et al. | |
| 7,127,623 B2 | 10/2006 | Potega | |
| 7,287,153 B1 * | 10/2007 | Hamersley | 713/1 |
| 7,743,124 B2 * | 6/2010 | Holdaway et al. | 709/222 |
| 7,765,094 B2 | 7/2010 | Bodden et al. | |
| 7,895,579 B2 | 2/2011 | Guerrera et al. | |
| 7,904,708 B2 | 3/2011 | Harmer | |
| 7,971,050 B2 | 6/2011 | Joshi et al. | |
| 8,006,062 B1 | 8/2011 | Cheng et al. | |
| 8,086,841 B2 * | 12/2011 | Guo et al. | 713/2 |
| 8,156,481 B1 | 4/2012 | Koh et al. | |
| 8,239,665 B2 * | 8/2012 | Liu et al. | 713/2 |
| 8,291,249 B2 | 10/2012 | Branover et al. | |
| 8,321,362 B2 | 11/2012 | Carrizo et al. | |

(Continued)

OTHER PUBLICATIONS

Kochhar et al., "Optimal BIOS settings for HPC with Dell PowerEdge 12th generation servers", Retrieved from: http://www.dellhpcsolutions.com/dellhpcsolutions/assets/Optimal_BIOS_HPC_Dell_12G.v1.0.pdf (Jul. 2012). (32 pages).

*Primary Examiner* — Suresh Suryawanshi
(74) *Attorney, Agent, or Firm* — Novak Druce Connolly Bove + Quigg LLP

(57) ABSTRACT

Each of a plurality of Basic Input/Output System (BIOS) performance profiles can be determined upon a corresponding performance goal. A particular performance profile can be selected from the plurality of BIOS performance profiles. A BIOS configuration can be determined for a computer system automatically based at least in part on the particular performance profile or a hardware configuration of the computer system. The computer system can be initialized with the BIOS configuration.

20 Claims, 7 Drawing Sheets

(56) References Cited

U.S. PATENT DOCUMENTS

| | | |
|---|---|---|
| 8,429,387 B2 | 4/2013 | Zimmer et al. |
| 8,489,869 B2 * | 7/2013 | Hsieh ............... 713/2 |
| 8,527,627 B2 | 9/2013 | Gerber et al. |
| 8,566,803 B2 | 10/2013 | Branson et al. |
| 8,639,964 B2 | 1/2014 | Berke et al. |
| 2005/0273588 A1 * | 12/2005 | Ong et al. ............... 713/2 |
| 2010/0145629 A1 | 6/2010 | Botich et al. |
| 2011/0225274 A1 | 9/2011 | Dvorkin et al. |
| 2013/0179706 A1 | 7/2013 | Sistla et al. |
| 2013/0249917 A1 | 9/2013 | Fanning et al. |

\* cited by examiner

SYSTEM AND METHOD FOR AUTOMATICALLY CONFIGURING BIOS PERFORMANCE PROFILES

BACKGROUND

This application relates to a Basic Input/Output System (BIOS) of a computer system, and more particularly to a method of configuring BIOS performance profiles for the computer system.

In a typical computer system (e.g., a rack server in a data center), a BIOS software program is stored on a BIOS chip located on a motherboard of the computer system. The BIOS stores firmware executed when the computer system is first powered on along with a set of configurations specified for the BIOS. The BIOS firmware and BIOS configurations are stored in a non-volatile memory such as a non-volatile random-access memory (NVRAM) or a read-only memory (ROM). The BIOS typically recognizes, initializes, and tests hardware present in a given computing system based on the set of configurations. The BIOS then gives control of the computer system to an operating system (OS). The BIOS provides an interface that allows a variety of different parameters to be set. For example, the BIOS can be used to specify clock and bus speeds, specify what peripherals are attached to the computer system, specify monitoring of health (e.g., fan speeds and CPU temperature limits), and specify a variety of other parameters that affect overall performance and power usage of the computer system.

Servers can be used by different data centers with different computing needs. For example, some servers are configured with an emphasis on power savings to reduce energy bills and heat management for a data center. In another example, other servers are configured with an emphasis on performance, regardless of power use, for use in high performance computing (HPC). For optimized operation, the servers for power savings can require a very different BIOS configuration than servers for high performance computing.

However, typical servers are preloaded with a single BIOS default configuration that cannot be optimal for the differing needs of the customers. In addition, BIOS configurations for servers are often complicated and can be closely tied to hardware combinations in each server. Traditionally, an administrator needs a human-to-machine interface and an OS application to select BIOS configurations for servers, which limits initial configurations of the servers.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In accordance with one or more aspects of the examples described herein, systems and methods are provided for automatically configuring Basic Input/Output System (BIOS) performance profiles.

In an aspect, a method is provided for automatically configuring BIOS performance profiles of a computer system. The method includes determining each of a plurality of BIOS performance profiles based upon a corresponding performance goal. The method includes selecting a particular performance profile from the plurality of BIOS performance profiles. The method includes determining a BIOS configuration for the computer system automatically based at least in part on the particular performance profile or a hardware configuration of the computer system. The method includes initializing the computer system with the BIOS configuration.

In a related aspect, the method further includes storing at least one of the particular performance profiles or the BIOS configuration corresponding to the particular performance profile in a non-volatile random access memory (NVRAM), and restarting the computer system.

In another aspect, an apparatus is provided for automatically configuring BIOS performance profiles of a computer system. The apparatus includes at least one processor configured for determining each of a plurality of BIOS performance profiles based upon a corresponding performance goal, selecting a particular performance profile from the plurality of BIOS performance profiles, determining a BIOS configuration for the computer system automatically based at least in part on the particular performance profile or a hardware configuration of the computer system, and initializing the computer system with the BIOS configuration.

In yet another aspect, a non-transitory computer-readable medium is provided for automatically configuring BIOS performance profiles of a computer system. The non-transitory computer-readable medium stores executable instructions which cause a data processing device to determine each of a plurality of BIOS performance profiles based upon a corresponding performance goal, select a particular performance profile from the plurality of BIOS performance profiles, determine a BIOS configuration for the computer system automatically based at least in part on the particular performance profile or a hardware configuration of the computer system, and initialize the computer system with the BIOS configuration.

BRIEF DESCRIPTION OF THE DRAWINGS

These and other sample aspects of the disclosure will be described in the detailed description and the appended claims that follow, and in the accompanying drawings, wherein:

DETAILED DESCRIPTION

The subject disclosure provides techniques for automatically configuring BIOS performance profiles of a computer system. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

Figure 1:
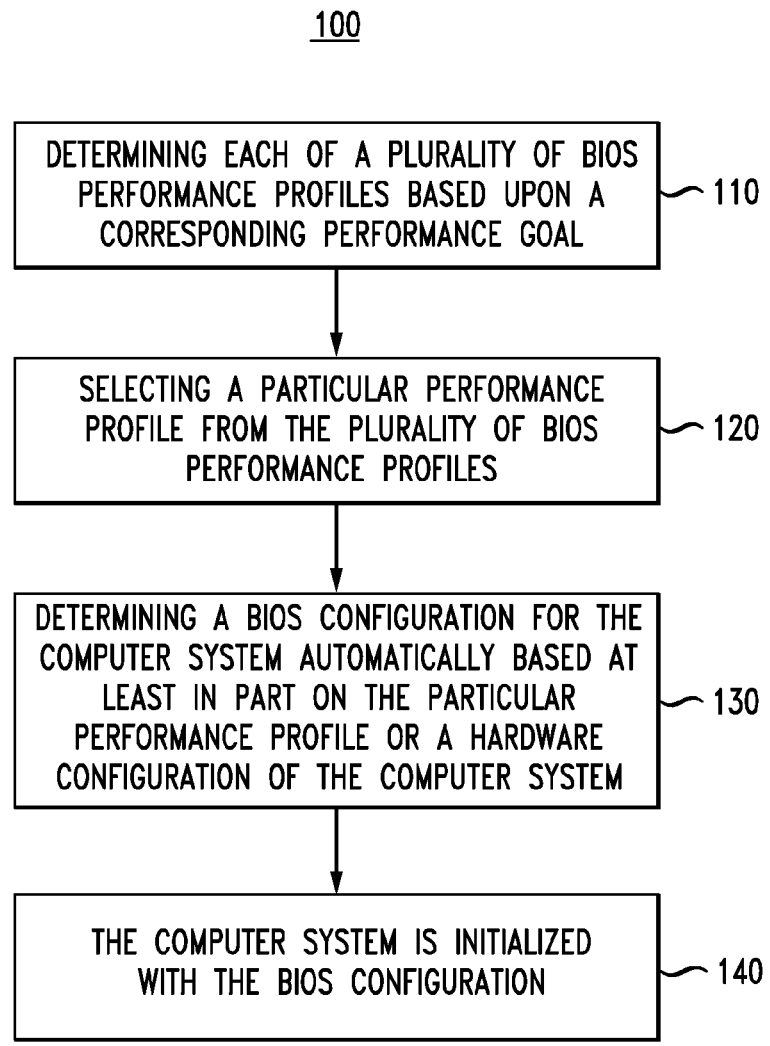
FIG. 1 illustrates an exemplary methodology for automatically configuring BIOS performance profiles.

In accordance with one or more aspects of the implementations described herein, with reference to FIG. 1, a methodology 100 is shown for automatically configuring BIOS performance profiles. The method 100 can involve, at step 110, determining a plurality of BIOS performance profiles corresponding to a plurality of performance goals. Each performance profile can refer to a mode of operation that corresponds to a particular performance goal. In an exemplary implementation, the plurality of BIOS performance profiles comprises at least one of a power saving mode, a balanced mode, a virtualization mode, or a high performance computing (HPC) mode.

The method 100 can involve, at step 120, selecting a particular performance profile from the plurality of BIOS performance profiles. In an exemplary implementation, selecting a particular performance profile occurs in a BIOS setup menu. In another exemplary implementation, selecting a particular performance profile occurs after loading an OS. In yet another exemplary implementation, selecting a particular performance profile occurs over a network connection via out-of-band or in-band management.

The method 100 can involve, at step 130, determining a BIOS configuration for a computer system automatically based at least in part on the particular performance profile and a hardware configuration of the computer system. Each performance profile can correspond to a variety of different BIOS configurations. In an exemplary implementation, determining the BIOS configuration comprises determining at least one of a processor clock speed, a memory clock speed, a memory latency, a front-side bus speed, or a processor voltage.

The method 100 can involve, at step 140, initializing the computer system with the BIOS configuration. In an exemplary implementation, initializing the computer system comprises loading the BIOS configuration into the BIOS via a Baseboard Management Controller (BMC).

The method 100 can optionally involve storing the particular performance profile in a NVRAM and restarting the computer system.

Figure 2:
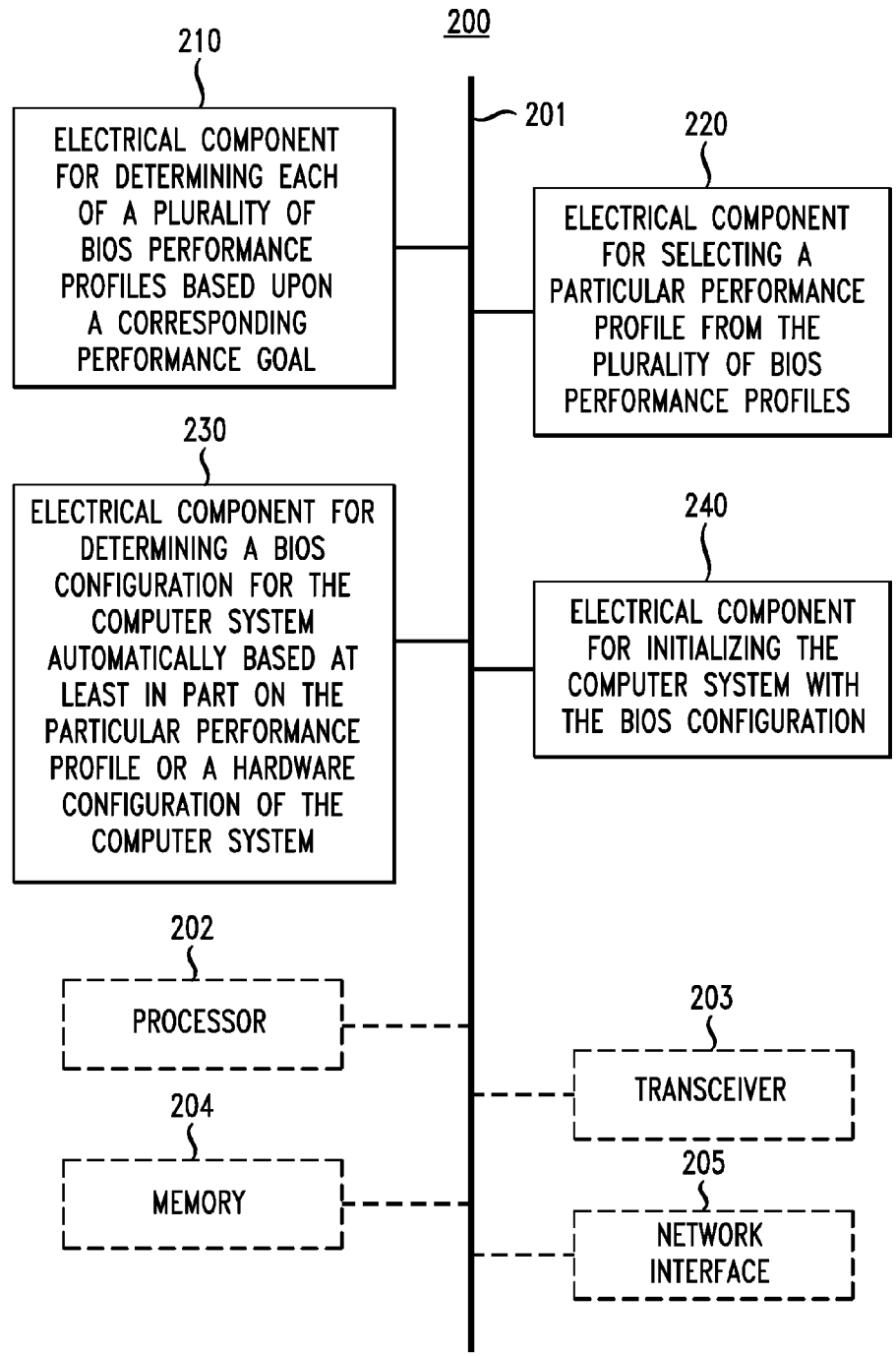
FIG. 2 illustrates an exemplary apparatus for automatically configuring BIOS performance profiles in accordance with the methodology of FIG. 1.

In accordance with one or more aspects of the implementations described herein, FIG. 2 illustrates an exemplary apparatus methodology for automatically configuring BIOS performance profiles in accordance with the methodology of FIG. 1. The exemplary apparatus 200 can be configured as a computing device or as a processor or similar device/component for use within. In one example, the apparatus 200 can include functional blocks that can represent functions implemented by a processor, software, or combination thereof (e.g., firmware). In another example, the apparatus 200 can be a system on a chip (SoC) or similar integrated circuit (IC).

In one implementation, the apparatus 200 can include an electrical component or module 210 for determining a plurality of BIOS performance profiles corresponding to a plurality of performance goals.

The apparatus 200 can include an electrical component 220 for selecting a particular performance profile from the plurality of BIOS performance profiles.

The apparatus 200 can include an electrical component 230 for determining a BIOS configuration for a computer system automatically based at least in part on the particular performance profile and a hardware configuration of the computer system.

The apparatus 200 can include an electrical component 240 for initializing the computer system with the BIOS configuration.

In further related aspects, the apparatus 200 can optionally include a processor component 202. The processor 202 can be in operative communication with the components 210-240 via a bus 201 or similar communication coupling. The processor 202 can effect initiation and scheduling of the processes or functions performed by electrical components 210-240.

In yet further related aspects, the apparatus 200 can include a radio transceiver component 203. A standalone receiver and/or standalone transmitter can be used in lieu of or in conjunction with the transceiver 203. The apparatus 200 can also include a network interface 205 for connecting to one or more other communication devices or the like. The apparatus 200 can optionally include a component for storing information, such as, for example, a memory device/component 204. The computer readable medium or the memory component 204 can be operatively coupled to the other components of the apparatus 200 via the bus 201 or the like. The memory component 204 can be adapted to store computer readable instructions and data for affecting the processes and behavior of the components 210-240, and subcomponents thereof, or the processor 202, or the methods disclosed herein. The memory component 204 can retain instructions for executing functions associated with the components 210-240. While shown as being external to the memory 204, it is to be understood that the components 210-240 can exist within the memory 204. It is further noted that the components in FIG. 2 can comprise processors, electronic devices, hardware devices, electronic subcomponents, logical circuits, memories, software codes, firmware codes, etc., or any combination thereof.

Persons skilled in the art will appreciate that the functionalities of each component of the apparatus 200 can be implemented in any suitable component of the system or combined in any suitable manner.

Figure 3:
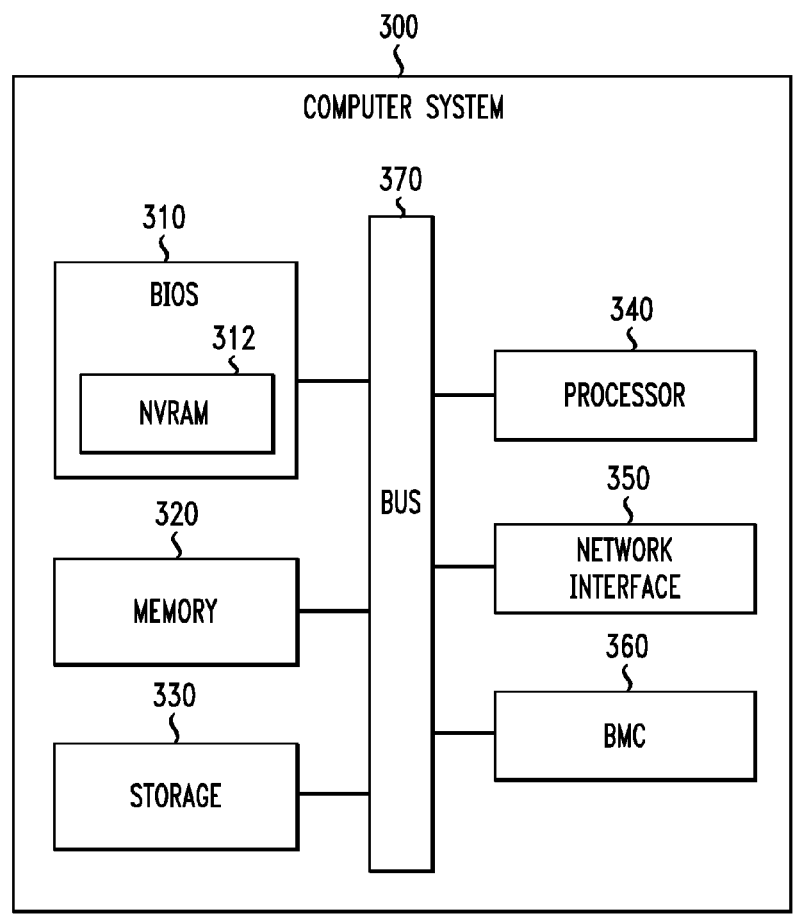
FIG. 3 illustrates a block diagram of an exemplary computer system.

FIG. 3 illustrates a block diagram of an exemplary computer system 300. The computer system 300 can include a processor 340, a network interface 350, a Baseboard Management Controller (BMC) 360, a memory 320, a storage 330, a BIOS 310, and a bus 370.

The computer system 300 can be, for example, a server (e.g., one of many rack servers in a data center) or a personal computer. The processor (e.g., central processing unit) 340 can retrieve and execute programming instructions stored in the memory 320 (e.g., random-access memory). The processor 340 can be a single CPU with a single processing core, a single CPU with multiple processing cores, or multiple CPUs. The storage 330 can include any form of non-volatile form of data storage such as a hard disk drive (HDD) or a flash drive. The bus 370 can transmit instructions and application data between computer components such as the processor 340, memory 320, storage 330, and networking interface 350.

The BIOS 310 can comprise a Basic Input/Output System or its successors or equivalents, such as an Extensible Firmware Interface (EFI) or Unified Extensible Firmware Interface (UEFI). The BIOS 310 can include a BIOS chip located on a motherboard of the computer system 300 storing a BIOS software program. The BIOS 310 can store firmware executed when the computer system is first powered on along with a set of configurations specified for the BIOS 310. The BIOS firmware and BIOS configurations can be stored in a non-volatile memory (e.g., NVRAM) 312 or a ROM.

The BIOS 310 can be loaded and executed as a sequence program each time the computer system 300 is started. The BIOS 310 can recognize, initialize, and test hardware present in a given computing system based on the set of configurations. The BIOS 310 can perform self-test, such as a Power-on-Self-Test (POST), on the computer system 300. This self-test can test functionality of various hardware components such as hard disk drives, optical reading devices, cooling devices, memory modules, expansion cards and the like. The BIOS can address and allocate an area in the memory 320 to store an operating system (OS). The BIOS 310 can then give control of the computer system to the OS.

The BIOS 310 of the computer system 300 can comprise a BIOS configuration that defines how the BIOS 310 controls various hardware components in the computer system 300. The BIOS configuration can determine the order in which the various hardware components in the computer system 300 are started. The BIOS 310 can provide an interface that allows a variety of different parameters to be set, which can be different from parameters in a BIOS default configuration. For example, a user (e.g., an administrator) can use the BIOS 310 to specify clock and bus speeds, specify what peripherals are attached to the computer system, specify monitoring of health (e.g., fan speeds and CPU temperature limits), and specify a variety of other parameters that affect overall performance and power usage of the computer system.

The BMC 360 can be a specialized microcontroller embedded on the motherboard of a computer, generally a server. The BMC 360 can manage the interface between system management software and platform hardware. Different types of sensors built into the computer system can report to the BMC 360 on parameters such as temperature, cooling fan speeds, power status, operating system (OS) status, etc. The BMC 360 can monitor the sensors and have the ability to send alerts to an administrator via the network interface 350 if any of the parameters do not stay within preset limits, indicating a potential failure of the system. The administrator can also remotely communicate with the BMC 360 to take some corrective action such as resetting or power cycling the system to restore functionality.

In an exemplary implementation, a plurality of BIOS performance profiles can be loaded into the BIOS 310 during manufacturing of the BIOS 310. In a related aspect, the BMC 360 can write the plurality of BIOS performance profiles into the BIOS 310 without the use of an OS. In another related aspect, an application running on an OS can write the plurality of BIOS performance profiles into the BIOS 310.

In an exemplary implementation, a user of the computer system 300 can select the particular BIOS performance profile using a BIOS setup menu. In a related aspect, the BIOS 310 can automatically determine the BIOS configuration. In a related aspect, the BIOS 310 can save the BIOS configuration into the NVRAM 312 of the BIOS 310.

Figure 4:
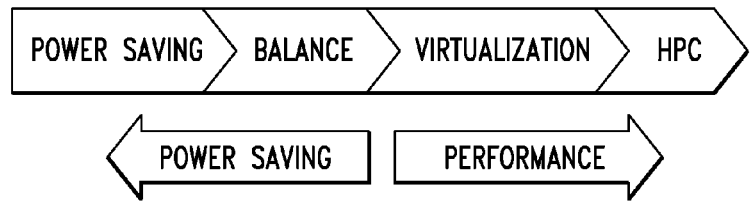
FIG. 4 illustrates an exemplary relationship between BIOS performance profiles and performance goals.

FIG. 4 illustrates an exemplary relationship between BIOS performance profiles and performance goals. For example, a set of BIOS performance profiles can include a power saving mode, a balanced mode, a virtualization mode, and a HPC mode. Generally, higher performance requires higher energy consumption. A computer system using the power saving mode can have a performance goal of having the lowest energy consumption, while a computer system using the HPC mode can have a performance goal of having the highest processor performance. The BIOS performance profiles can have different BIOS configurations, each of which is configured to implement a particular performance goal corresponding to one of the BIOS performance profiles.

Figure 5:
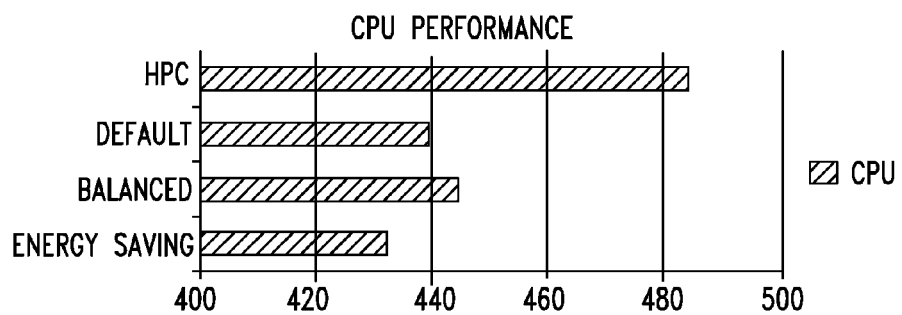
FIG. 5 illustrates an exemplary comparison of processor performance for a plurality of BIOS performance profiles.

FIG. 5 illustrates an exemplary comparison of processor performance for a plurality of BIOS performance profiles. A HPC BIOS performance profile can have the highest CPU performance, while an energy saving BIOS performance profile can have the lowest CPU performance.

Figure 6:
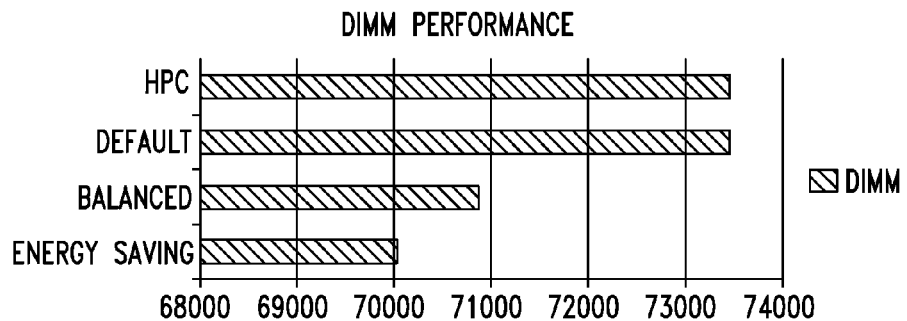
FIG. 6 illustrates an exemplary comparison of memory performance for a plurality of BIOS performance profiles.

FIG. 6 illustrates an exemplary comparison of memory performance for a plurality of BIOS performance profiles. Memory can refer to one or more dual in-line memory modules (DIMM) in a computer system. A HPC BIOS performance profile can have the highest memory performance, while an energy saving BIOS performance profile can have the lowest DIMM performance.

Figure 7:
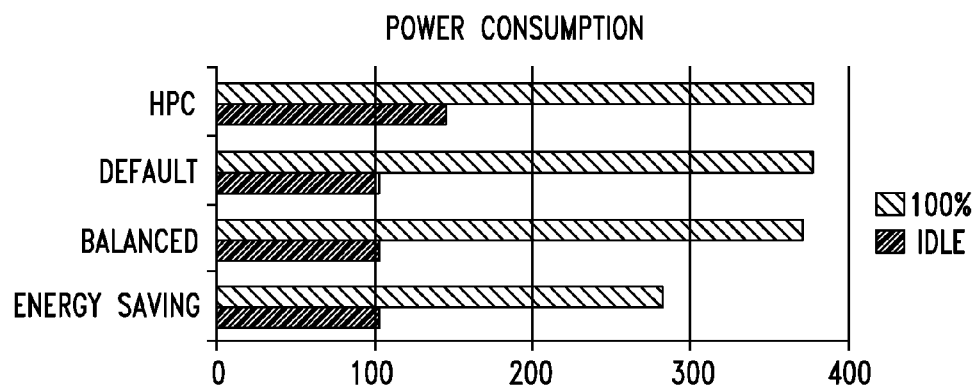
FIG. 7 illustrates an exemplary comparison of power consumption for a plurality of BIOS performance profiles.

FIG. 7 illustrates an exemplary comparison of power consumption for a plurality of BIOS performance profiles. A HPC BIOS performance profile can have the highest energy consumption, while an energy saving BIOS performance profile can have the lowest energy consumption.

Figure 8:
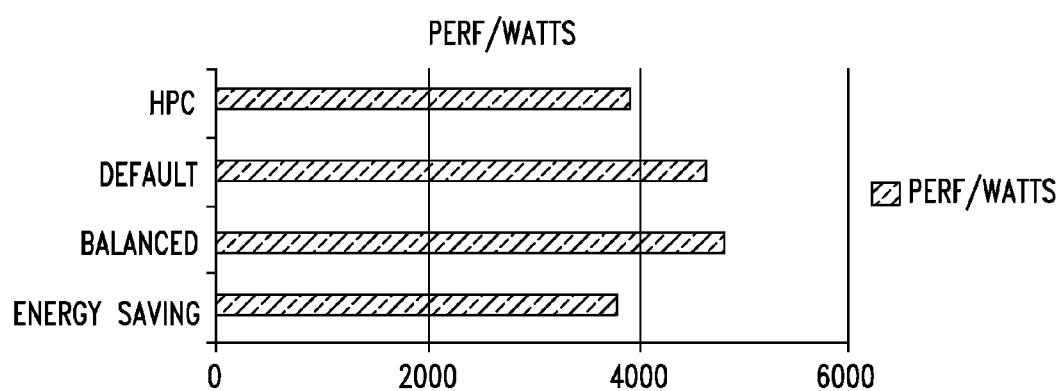
FIG. 8 illustrates an exemplary comparison of performance to power consumption efficiency for a plurality of BIOS performance profiles.

FIG. 8 illustrates an exemplary comparison of performance to power consumption efficiency for a plurality of BIOS performance profiles. A balanced BIOS performance profile can have the highest performance to energy consumption ratio.

Figure 9:
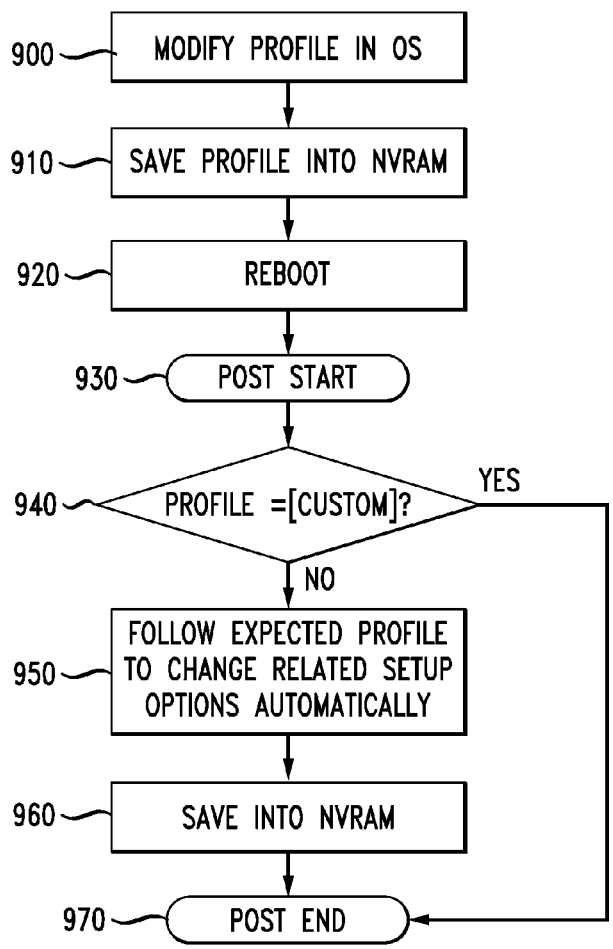
FIG. 9 illustrates a flow chart of an exemplary method for automatically configuring BIOS performance profiles for a computer system.

FIG. 9 illustrates a flow chart of an exemplary method for automatically configuring BIOS performance profiles of a computer system. At step 900, a BIOS performance profile can be set in an OS. For example, a user can select a BIOS performance profile from a plurality of preset BIOS performance profiles (e.g., HPC, virtualization, balanced, and power saving) using an application on the OS. In another example, a user can create a custom BIOS performance profile that is not one of the plurality of BIOS performance profiles. If the user creates the custom BIOS performance profile, the user can manually specify one or more BIOS settings (e.g., clock speed, DIMM speed, voltages, boot sequence, etc.) to create a custom BIOS configuration. In yet another example, a BIOS performance profile can be received by the OS from a network. In a further example, a BIOS performance profile can be received by a BMC from an out-of-band network.

At step 910, the BIOS performance profile can be saved into a NVRAM of the BIOS. In this manner, the BIOS performance profile can be made available to the BIOS when the computer system restarts. In step 920, the computer system restarts. The restart can occur immediately after setting the BIOS performance profile, or can occur some time after. At step 930, the BIOS can start performing a self-test (e.g., POST).

At step 940, the BIOS can check if the BIOS performance profile is a custom profile or one of the plurality of preset BIOS performance profiles. If the BIOS performance profile is a custom profile, the method continues to step 970, where the custom BIOS performance profile is used without further changes by the BIOS. If the BIOS performance profile is one of the plurality of preset BIOS performance profiles, the method continues to step 950.

At step 950, the BIOS can determine a BIOS configuration for the computer system automatically based at least in part on the BIOS performance profile and a hardware configuration of the computer system. For example, if the BIOS performance profile is a HPC mode with a performance goal of maximizing CPU clock speed, the BIOS configuration can be determined based at least in part on a CPU model, a number of cores of the CPU, or available cooling hardware of the computer system. The CPU model and the number of cores of the CPU can be used to determine safe operating clock speeds and voltages for the CPU.

At step 960, the BIOS can save the BIOS configuration into the NVRAM. At step 970, the BIOS completes the self-test processing with the BIOS configuration or the custom BIOS configuration.

Figure 10:
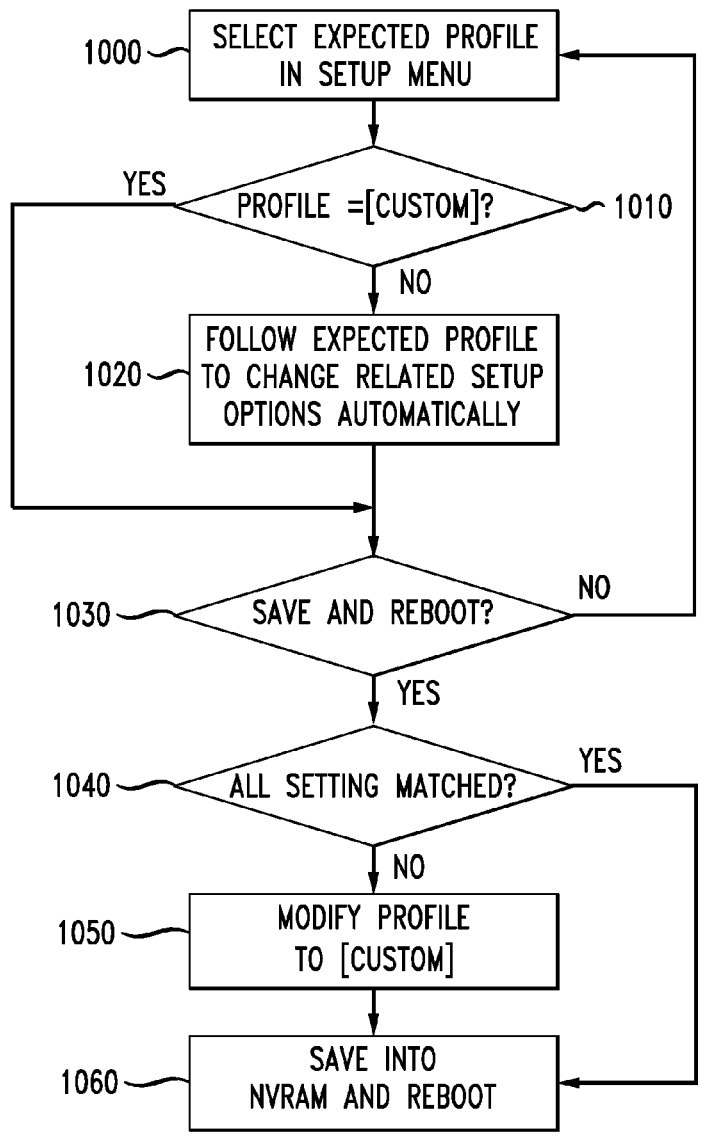
FIG. 10 illustrates a flow chart of a second example method for automatically configuring BIOS performance profiles for a computer system.

FIG. 10 illustrates a flow chart of a second example method for automatically configuring BIOS performance profiles. At step 1000, a user can select a particular BIOS performance profile from a plurality of BIOS performance profiles. In an exemplary aspect, a user can select the particular BIOS performance profile in a setup menu of a BIOS during a POST of a computer system. In another example aspect, a user can set a custom BIOS configuration.

At step 1010, the BIOS can check if the BIOS performance profile is a custom profile or one of the plurality of preset BIOS performance profiles. If the BIOS performance profile is a custom profile, the method continues to step 1030, where the custom BIOS configuration is used without further changes by the BIOS. If the BIOS performance profile is one of the plurality of preset BIOS performance profiles, the method continues to step 1020.

At step 1020, the BIOS can determine a BIOS configuration for the computer system automatically based at least in part on the BIOS performance profile and a hardware configuration of the computer system. For example, if the BIOS performance profile is a HPC mode with a performance goal of maximizing CPU clock speed, the BIOS configuration can be determined based at least in part on a CPU model, a number of cores of the CPU, or available cooling hardware of the computer system. The CPU model, the number of cores of the CPU can be used to determine safe operating clock speeds and voltages for the CPU.

At step 1030, the BIOS can confirm with the user whether to save the BIOS configuration or the custom BIOS configuration. If the user chooses not to save, the method continues to step 1000.

At step 1040, the BIOS checks if the BIOS configuration or the custom BIOS configuration matches a current BIOS configuration. If there is a match, the method continues to step 1060. If there is no match (i.e., changes were made to the current BIOS configuration), the method, at step 1050, saves changes into the current BIOS configuration.

At step 1060, the BIOS saves the BIOS configuration or the custom BIOS configuration into a NVRAM of the BIOS. The BIOS can then restart the computer system.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A method for automatically configuring Basic Input/Output System (BIOS) performance profiles of a computer system, the method comprising:
    determining each of a plurality of BIOS performance profiles based upon a corresponding performance goal;
    selecting a particular performance profile from the plurality of BIOS performance profiles;
    determining a BIOS configuration for the computer system automatically based at least in part on the particular performance profile and a hardware configuration of the computer system; and
    initializing the computer system with the BIOS configuration.

2. The method of claim 1, wherein selecting a particular performance profile occurs in a BIOS setup menu.

3. The method of claim 1, wherein selecting a particular performance profile occurs after loading an operating system (OS).

4. The method of claim 1, further comprising:
storing at least one of the particular performance profiles or the BIOS configuration corresponding to the particular performance profile in a non-volatile random access memory (NVRAM); and
restarting the computer system.

5. The method of claim 1, wherein selecting a particular performance profile occurs over a network connection via out-of-band or in-band management.

6. The method of claim 1, wherein determining the BIOS configuration comprises determining at least one of a processor clock speed, a memory clock speed, a memory latency, a front-side bus speed, or a processor voltage.

7. The method of claim 1, wherein the plurality of BIOS performance profiles comprises at least one of a power saving mode, a balanced mode, a virtualization mode, or a high performance computing (HPC) mode.

8. The method of claim 1, wherein initializing the computer system with the BIOS configuration comprises loading the BIOS configuration into the BIOS via a Baseboard Management Controller (BMC).

9. An apparatus configured for automatically configuring Basic Input/Output System (BIOS) performance profiles, the apparatus comprising:
at least one processor configured for determining each of a plurality of BIOS performance profiles for a computer system based upon a corresponding performance goal, selecting a particular performance profile from the plurality of BIOS performance profiles, determining a BIOS configuration for the computer system automatically based at least in part on the particular performance profile and a hardware configuration of the computer system, and initializing the computer system with the BIOS configuration.

10. The apparatus of claim 9, wherein selecting a particular performance profile occurs in a BIOS setup menu.

11. The apparatus of claim 9, wherein selecting a particular performance profile occurs after loading an operating system (OS).

12. The apparatus of claim 9, wherein the at least one processor is further configured for:
storing at least one of the particular performance profiles or the BIOS configuration corresponding to the particular performance profile in a non-volatile random access memory (NVRAM); and
restarting the computer system.

13. The apparatus of claim 9, wherein selecting a particular performance profile occurs over a network connection via out-of-band or in-band management.

14. The apparatus of claim 9, wherein determining the BIOS configuration comprises determining at least one of a processor clock speed, a memory clock speed, a memory latency, a front-side bus speed, or a processor voltage.

15. The apparatus of claim 9, wherein the plurality of BIOS performance profiles comprises at least one of a power saving mode, a balanced mode, a virtualization mode, or a high performance computing (HPC) mode.

16. The apparatus of claim 9, wherein initializing the computer system with the BIOS configuration comprises loading the BIOS configuration into the BIOS via a Baseboard Management Controller (BMC).

17. A non-transitory computer-readable medium storing executable instructions, which when executed by a processor of a data processing device, causes the processor to:
determine each of a plurality of BIOS performance profiles based upon a corresponding performance goal;
select a particular performance profile from the plurality of BIOS performance profiles;
determine a BIOS configuration for a computer system automatically based at least in part on the particular performance profile and a hardware configuration of the computer system; and
initialize the computer system with the BIOS configuration.

18. The non-transitory computer-readable medium of claim 17, wherein the computer-readable medium further causes the data processing device to:
storing at least one of the particular performance profiles or the BIOS configuration corresponding to the particular performance profile in a non-volatile random access memory (NVRAM); and
restarting the computer system.

19. The non-transitory computer-readable medium of claim 17, wherein determining the BIOS configuration comprises determining at least one of a processor clock speed, a memory clock speed, a memory latency, a front-side bus speed, or a processor voltage.

20. The non-transitory computer-readable medium of claim 17, wherein initializing the computer system with the BIOS configuration comprises loading the BIOS configuration into the BIOS via a Baseboard Management Controller (BMC).

* * * * *